(12) United States Patent
Maeda

(10) Patent No.: US 9,617,910 B2
(45) Date of Patent: Apr. 11, 2017

(54) TURBOCHARGER

(71) Applicant: TOYOTA JIDOSHA KABUSHIKI KAISHA, Toyota-shi, Aichi-ken (JP)

(72) Inventor: Osamu Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 14/791,805

(22) Filed: Jul. 6, 2015

(65) Prior Publication Data
US 2016/0003139 A1   Jan. 7, 2016

(30) Foreign Application Priority Data
Jul. 7, 2014   (JP) ................. 2014-139471

(51) Int. Cl.
*F01D 25/12*   (2006.01)
*F01D 25/26*   (2006.01)
*F02C 6/12*   (2006.01)
*F02B 39/00*   (2006.01)
(Continued)

(52) U.S. Cl.
CPC ............ *F02B 39/005* (2013.01); *F01D 9/026* (2013.01); *F01D 25/125* (2013.01); *F01D 25/26* (2013.01); *F02C 6/12* (2013.01); *F02C 7/12* (2013.01); *F05D 2220/40* (2013.01); *F05D 2260/20* (2013.01); *F05D 2260/2214* (2013.01);
(Continued)

(58) Field of Classification Search
CPC ........ F01D 9/026; F01D 25/125; F01D 25/26; F02B 39/005; F02C 6/12; F02C 7/12; F05D 2220/40; F05D 2260/20; F05D 2260/2214; F05D 2260/39; F05D 2260/94; F05D 2260/941
See application file for complete search history.

(56) References Cited

U.S. PATENT DOCUMENTS 4,364,717 A * 12/1982 Schippers ............. F01D 25/125
   415/180
4,376,617 A    3/1983 Okano et al.
(Continued)

FOREIGN PATENT DOCUMENTS

JP   S56-148620 A   11/1981
JP   S59-180032 A   10/1984
(Continued)

OTHER PUBLICATIONS

Nov. 19, 2015 Extended Search Report issued in European Patent Application No. 15175669.9.

*Primary Examiner* — Audrey K Bradley
(74) *Attorney, Agent, or Firm* — Oliff PLC

(57) ABSTRACT

A turbocharger includes a turbine impeller, a rotating shaft, a bearing housing, a turbine housing. The turbine housing includes a scroll passage and a second flange. The turbine housing has an outer surface provided with a recessed portion, the recessed portion is provided between the scroll passage and the second flange. The recessed portion is a depressed portion toward an inner surface of the turbine housing from the outer surface of the turbine housing. The bearing housing has a main passage. The second flange has an extending passage. The main passage is connected to the extending passage so as to constitute a first coolant passage. The turbine housing has a second coolant passage around the scroll passage.

4 Claims, 4 Drawing Sheets

(51) Int. Cl.
*F01D 9/02* (2006.01)
*F02C 7/12* (2006.01)

(52) U.S. Cl.
CPC ...... *F05D 2260/39* (2013.01); *F05D 2260/94* (2013.01); *F05D 2260/941* (2013.01)

(56) References Cited

U.S. PATENT DOCUMENTS

| | | | |
|---|---|---|---|
| 8,209,980 B2* | 7/2012 | Takagawa | F01N 3/2006 123/193.5 |
| 2010/0266430 A1* | 10/2010 | Shimizu | F02B 37/10 417/423.8 |
| 2011/0180026 A1 | 7/2011 | Heusler | |
| 2015/0377064 A1* | 12/2015 | Celaya | F01D 25/14 415/1 |

FOREIGN PATENT DOCUMENTS

| | | |
|---|---|---|
| JP | S60-155733 U | 10/1985 |
| JP | 2002-221080 A | 8/2002 |
| JP | 2009-243299 A | 10/2009 |
| JP | 2010-048187 A | 3/2010 |

* cited by examiner

TURBOCHARGER

INCORPORATION BY REFERENCE

The disclosure of Japanese Patent Application No. 2014-139471 filed on Jul. 7, 2014 including the specification, drawings and abstract is incorporated herein by reference in its entirety.

BACKGROUND OF THE INVENTION

1. Field of the Invention

The present invention relates to a turbocharger to be provided in an internal combustion engine.

2. Description of Related Art

Japanese Patent Application Publication No. 2010-48187 (JP 2010-48187 A) describes a turbocharger in which a turbine housing is provided with a coolant passage formed so as to cover a scroll passage.

SUMMARY OF THE INVENTION

In the turbine housing of the turbocharger described in JP 2010-48187 A, a wall surface of the scroll passage is kept at a relatively low temperature by circulation of coolant. In contrast, a flange abutting with a bearing housing is not cooled down, so a temperature of the flange becomes relatively high. Accordingly, a divergence is caused between the temperature of the flange and the temperature of the wall surface of the scroll passage, which may cause a difference in thermal expansion amount between the flange and the wall surface of the scroll passage. Because of this, distortion may be caused by a stress due to the difference in thermal expansion amount between the flange and the wall surface of the scroll passage.

The flange is formed in a plate shape formed by increasing a diameter of an end part of the turbine housing. The scroll passage is formed in a projecting manner so as to cover a turbine wheel. On that account, a recessed portion is formed between the flange and the scroll passage in the turbine housing.

When a difference in thermal expansion amount is caused between the flange and the wall surface of the scroll passage as such, a stress due to the difference in thermal expansion amount is easy to be concentrated on the recessed portion placed between the flange and the scroll passage. Because of this, the recessed portion may be easily affected by the distortion in particular.

The present invention provides a turbocharger that can restrain an occurrence of stress concentration due to a difference in thermal expansion amount.

An aspect of the present invention relates to a turbocharger including a turbine impeller; a rotating shaft connected to the turbine impeller; a bearing housing configured to accommodate the rotating shaft in the bearing housing; and a turbine housing configured to accommodate the turbine impeller in the turbine housing. The turbine housing includes a scroll passage and a second flange. The scroll passage surrounds the turbine impeller, and the second flange abuts with the bearing housing. The turbine housing has an outer surface provided with a recessed portion, the recessed portion is provided between the scroll passage and the second flange, the recessed portion is a depressed portion toward an inner surface of the turbine housing from the outer surface of the turbine housing. The bearing housing has a main passage. The second flange has an extending passage. The main passage is connected to the extending passage so as to constitute a first coolant passage. The turbine housing has a second coolant passage around the scroll passage.

According to the above configuration, since the extending passage, which is a part of the first coolant passage, is formed in the flange of the turbine housing, it is possible to circulate coolant through the flange of the turbine housing. This allows the flange to be cooled down, so that a divergence between a temperature of the flange of the turbine housing and a temperature of a wall surface of the scroll passage that is cooled down by the coolant flowing through the second coolant passage becomes small in the turbine housing. That is, a difference in thermal expansion amount between the flange and the wall surface of the scroll passage is reduced. Accordingly, a stress caused due to the difference in thermal expansion amount is reduced, thereby making it possible to restrain a stress from concentrating on the recessed portion. In short, it is possible to restrain an occurrence of stress concentration due to the difference in thermal expansion amount.

In the turbocharger, the bearing housing includes a first flange. The first flange has a flange surface abutting with the second flange of the turbine housing, the flange surface being a surface perpendicular to an axial direction of the rotating shaft. The extending passage extends in a direction from the flange surface toward the scroll passage along the axial direction of the rotating shaft. In the turbine housing, a first distance in the axial direction of the rotating shaft is shorter than a second distance in the axial direction of the rotating shaft. The first distance indicates a distance, along the axial direction of the rotating shaft, between the flange surface and a part where a wall thickness between the recessed portion and the inner surface of the turbine housing is thinnest in that section of the turbine housing which is perpendicular to the axial direction of the rotating shaft. The second distance indicates a distance, along the axial direction of the rotating shaft, between the flange surface and a bottom of the extending passage in the axial direction of the rotating shaft.

According to the above configuration, the extending passage is formed to a position distanced more from the flange surface in a rotating-shaft direction of the turbine impeller, than that part of the recessed portion on which a stress due to the difference in thermal expansion amount between the flange and the wall surface of the scroll passage is easily concentrated. In view of this, according to the above configuration, it is possible to effectively cool down that part of the recessed portion on which the stress due to the difference in thermal expansion amount is easily concentrated, by the coolant circulating through the first coolant passage constituted by the extending passage and the main passage.

In the turbocharger, at least part of a surface of the extending passage is rougher than a surface of the main passage. According to the above configuration, a surface area of a wall surface formed by the extending passage in the first coolant passage increases. That is, since an area where the wall surface of the coolant passage makes contact with the coolant increases, it is possible to improve efficiency of heat transfer between the turbine housing and the coolant. Due to the improvement in the efficiency of heat transfer, it is possible to restrain a stress due to the difference in thermal expansion amount, thereby making it possible to more effectively restrain the stress from concentrating on the recessed portion.

In the turbocharger, that part of the surface of the extending passage which is placed at a radially inner side of the turbine housing is rougher than the surface of the main passage. Exhaust gas compressed through the scroll passage is sprayed on the turbine impeller accommodated in the turbine housing. Accordingly, a wall on the radially inner side of the turbine housing is exposed to high-temperature exhaust gas compressed and sprayed on the turbine impeller, so that a temperature of the wall easily becomes high in particular in the turbine housing.

According to the above configuration, since that part of the surface of the extending passage which is placed at the radially inner side of the turbine housing is formed to be rough, it is possible to increase cooling efficiency with respect to that wall surface on the radially inner side of which the temperature easily becomes high in particular in the turbine housing. Accordingly, it is possible to effectively cool down that wall surface on the radially inner side the temperature of which easily becomes high in particular in the turbine housing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1B:
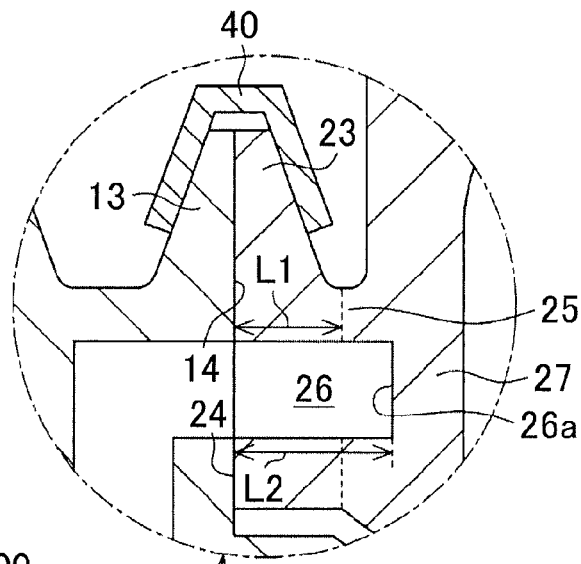
FIG. 1B is a magnified view illustrating a part of the turbine portion in FIG. 1A in a magnified manner.

One embodiment of a turbocharger is described below with reference to FIG. 1A, FIG. 1B and FIG. 2. As illustrated in FIG. 1A, a turbocharger 100 is constituted by combining a turbine housing 20 with a bearing housing 10. The turbine housing 20 is configured to accommodate a turbine impeller 30 in the turbine housing. The bearing housing 10 is configured to accommodate a rotating shaft 31 connected to the turbine impeller 30.

Hereinafter, a rotating-shaft direction of the turbine impeller 30 is referred to as an axial direction. A right end part of the bearing housing 10 in FIG. 1A forms a flange 13 that is increased in diameter. The flange 13 forms a flange surface 14 serving as an abutting surface with the turbine housing 20. The flange surface 14 is formed as a surface perpendicular to the axial direction. A main passage 11 opened on the flange surface 14 is formed in the bearing housing 10. The main passage 11 forms a first coolant passage 12 together with an extending passage 26 to be described later.

A scroll passage 21 configured to guide exhaust gas to the turbine impeller 30 is formed in the turbine housing 20. Further, a second coolant passage 22 is formed in the turbine housing 20 so as to cover the scroll passage 21. The second coolant passage 22 is formed in a part of a wall forming the scroll passage 21 except a vertical wall 27 that is a wall provided on a bearing-housing-10 side and perpendicular to the axial direction.

A left end part of the turbine housing 20 in FIG. 1A forms a flange 23 that is increased in diameter. The flange 23 has an abutting surface 24 with respect to the bearing housing 10. Between the flange 23 and the scroll passage 21, a housing outer surface is depressed toward a housing inner surface so as to form a recessed portion 25 deceased in diameter.

Further, an extending passage 26 is formed in the flange 23. The extending passage 26 is opened on the abutting surface 24, and is provided so as to pass through a radially inner side relative to the recessed portion 25 in the turbine housing 20.

Figure 1A:
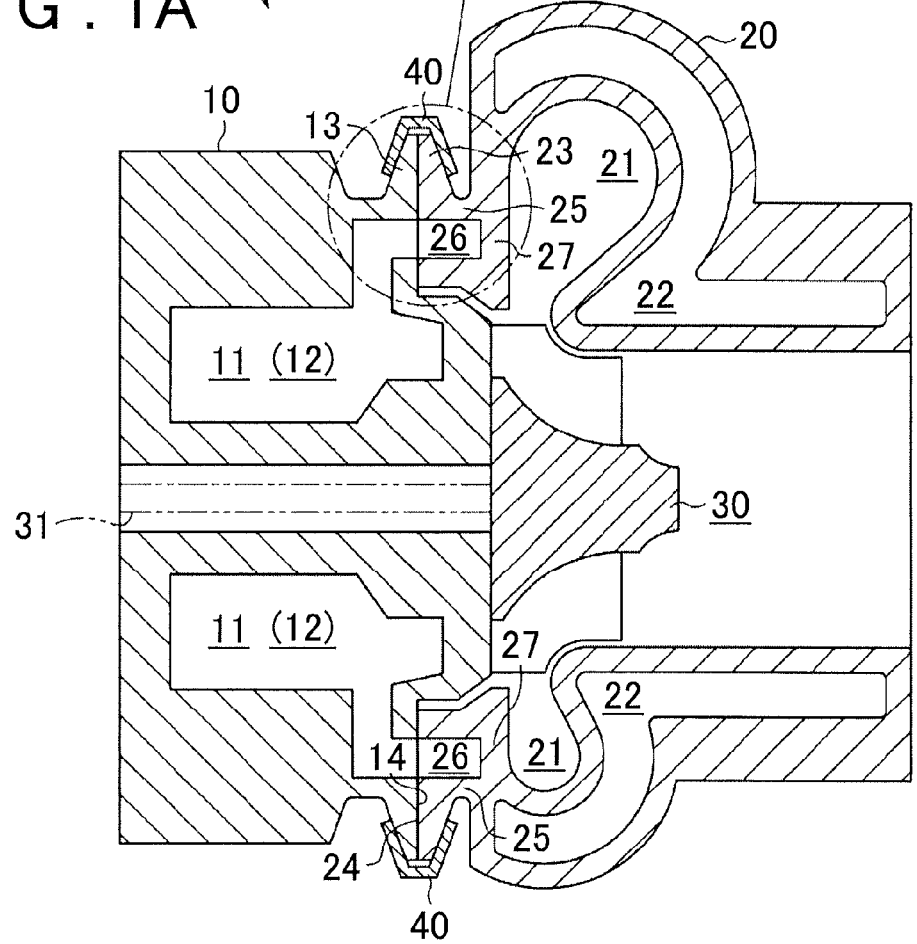
FIG. 1A is a sectional view illustrating a turbine portion in one embodiment of a turbocharger.

As illustrated in FIG. 1B, the extending passage 26 is provided so that a distance L2 is longer than a distance L1. Here, the distance L1 indicates a distance, along the axial direction, between the abutting surface 24 and a part (a part indicated by a broken line in FIG. 1B) where a wall between the recessed portion 25 and the housing inner surface is thinnest in that section of the turbine housing 20 which is perpendicular to the axial direction. Further, the distance L2 indicates a distance, along the axial direction, between the abutting surface 24 and a bottom part 26a of the extending passage 26 in the axial direction.

That is, the extending passage 26 is provided so as to extend in the axial direction to a position more distanced from the abutting surface 24 than the part where the wall between the recessed portion 25 and the housing inner surface is thinnest in that section of the turbine housing 20 which is perpendicular to the axial direction. That is, the extending passage 26 extends in a direction from the flange surface toward the scroll passage along the axial direction of the rotating shaft.

The bearing housing 10 and the turbine housing 20 are fastened and fixed by sandwiching the flange 13 and the flange 23 by a clamp 40. The clamp 40 is formed annularly. A part between the flange surface 14 of the flange 13 and the abutting surface 24 of the flange 23 is sealed.

The main passage 11 and the extending passage 26 are formed such that, when the bearing housing 10 and the turbine housing 20 are fixed as such, openings of the main passage 11 and the extending passage 26 are connected to each other following the abutment between the flange 13 and the flange 23. Hereby, in the turbocharger 100, when the main passage 11 is connected to the extending passage 26 along with fixation between the bearing housing 10 and the turbine housing 20, the first coolant passage 12 is formed.

Figure 2:
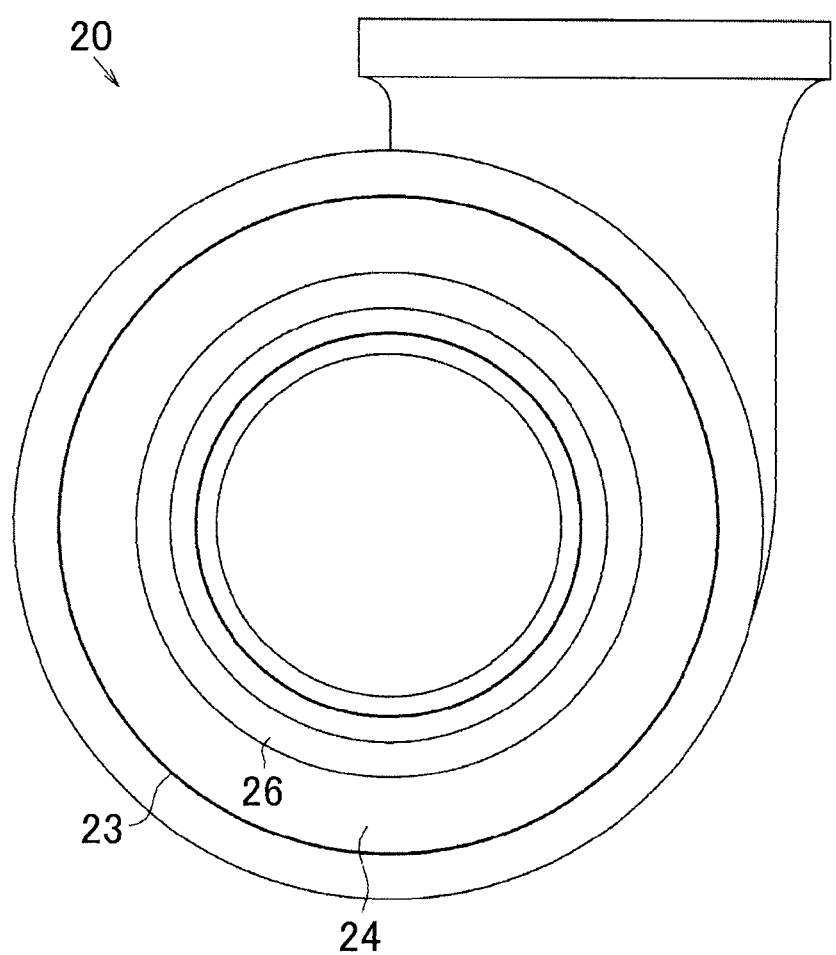
FIG. 2 is a plan view illustrating a structure of a turbine housing constituting the turbocharger according to the embodiment, when viewed from a flange side.

As illustrated in FIG. 2, the extending passage 26 is formed on the abutting surface 24 as a consecutively annular groove. As such, in the turbocharger 100, the first coolant passage 12 configured to circulate coolant through the bearing housing 10 and the flange 23 of the turbine housing 20, and the second coolant passage 22 configured to circulate coolant through the turbine housing 20 are formed. Further, in the turbocharger 100, the extending passage 26 is provided in the flange 23, so that coolant is also circulated through the flange 23.

These two coolant passages are provided in parallel to each other in a coolant circulation course in an internal combustion engine. The following describes an operation of the turbocharger 100 according to the present embodiment in comparison with a turbocharger in which coolant is not circulated through a flange.

A housing of a turbocharger thermally expands due to a temperature increase caused by inflow of exhaust gas. In view of this, a coolant passage configured to circulate coolant is provided in the housing of the turbocharger.

Figure 3:
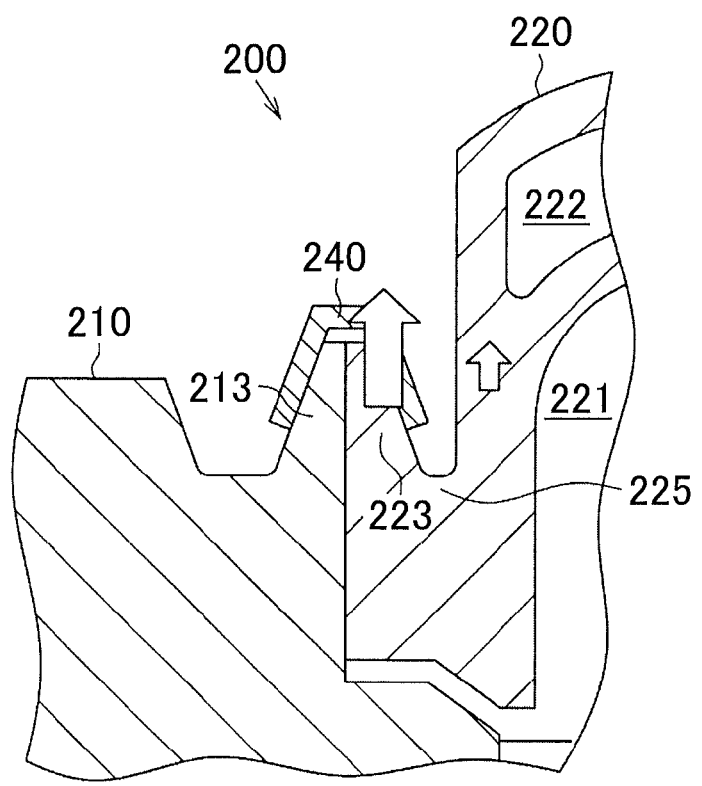
FIG. 3 is a sectional view illustrating a vicinal area of a recessed portion of a turbocharger in a comparative example.

For example, in a turbocharger 200 of a comparative example illustrated in FIG. 3, a coolant passage 222 is formed so as to cover a scroll passage 221 formed in a turbine housing 220. Accordingly, a wall surface of the scroll passage 221 is cooled down by coolant flowing through the coolant passage 222. In the meantime, a flange 223 is not provided with a coolant passage, so that coolant does not circulate therethrough. Accordingly, the flange 223 is not cooled down. Because of this, a temperature of the wall surface of the scroll passage 221 that is cooled down by the coolant may diverge from a temperature of the flange 223 that is not cooled down by the coolant.

In the turbocharger 200, a coolant passage is not provided in a bearing housing 210. Because of this, heat is transmitted from a flange 213 of the bearing housing 210 that is not cooled down, to the flange 223 of the turbine housing 220, so that a temperature of the flange 223 is easy to increase.

As such, while the wall surface of the scroll passage 221 that is cooled down by the coolant is maintained at a relatively low temperature, the flange 223 that is not cooled down by the coolant may have a relatively high temperature. As a result, a divergence is caused between the temperature of the flange 223 and the temperature of the wall surface of the scroll passage 221, and a difference may be caused between a thermal expansion amount of the flange 223 and a thermal expansion amount of the wall surface of the scroll passage 221, as indicated by an arrow in FIG. 3.

As a result, stress concentration may occur in a recessed portion 225 between the flange 223 and the scroll passage 221 in the turbine housing 220, due to the difference between the thermal expansion amounts.

Further, in the turbocharger 200, the flange 223 is fastened and fixed to the flange 213 by a clamp 240. Because of this, the flange 223 is affected by thermal expansion of that flange 213 on a bearing-housing-210 side which is not provided with a coolant passage.

That is, in such a turbocharger 200, a stress is easily concentrated on the recessed portion 225. In this regard, in the turbocharger 100 according to the present embodiment, since the extending passage 26, which is a part of the first coolant passage 12, is formed in the flange 23 of the turbine housing 20 as described above, the coolant circulates through the flange 23 of the turbine housing 20.

Since the extending passage 26 according to the present embodiment is provided so as to extend to the radially inner side of the recessed portion 25, the coolant also circulates through the radially inner side of the recessed portion 25. According to the present embodiment described above, it is possible to obtain the following effects.

(1) Since the extending passage 26, which is a part of the first coolant passage 12, is formed in the flange 23 of the turbine housing 20, it is possible to circulate the coolant through the flange 23 of the turbine housing 20. Since the flange 23 is cooled down, a divergence between the temperature of the flange 23 and the temperature of the wall surface of the scroll passage 21 cooled down by the coolant flowing through the second coolant passage 22 becomes small in the turbine housing 20. That is, a difference in thermal expansion amount between the flange 23 and the wall surface of the scroll passage 21 is reduced. Accordingly, the stress caused due to the difference in thermal expansion amount is reduced, thereby making it possible to restrain a stress from concentrating on the recessed portion 25. In short, it is possible to restrain an occurrence of stress concentration due to the difference in thermal expansion amount.

(2) Since the extending passage 26 is provided in an extending manner so as to pass through the radially inner side of the recessed portion 25, the radially inner side of the recessed portion 25 can be cooled down by the coolant flowing through the extending passage 26. That is, the difference in thermal expansion amount between the flange 23 and the scroll passage 21 is reduced effectively, thereby making it possible to restrain a stress from concentrating on the recessed portion 25.

(3) The extending passage 26 is formed to a position axially distanced more from the flange surface 14 than that part of the recessed portion 25 on which a stress due to the difference in thermal expansion amount between the flange 23 and the wall surface of the scroll passage 21 is easily concentrated. That is, it is possible to effectively cool down that part of the recessed portion 25 on which the stress due to the difference in thermal expansion amount is easily concentrated, by the coolant circulating through the first coolant passage 12 constituted by the extending passage 26 and the main passage 11.

(4) The coolant passage that cools down the scroll passage 21 is formed around the scroll passage 21. In this case, if the coolant passage is formed even in a wall on a bearing-housing-10 side, that is, in the vertical wall 27 in the wall constituting the scroll passage 21 of the turbine housing 20, the vertical wall 27 becomes thick.

In this regard, in the turbine housing 20 according to the present embodiment, the first coolant passage 12 is formed on one side of the vertical wall 27 in an extending direction of the rotating shaft, and the second coolant passage 22 is formed on the other side thereof. That is, the coolant passage that cools down the scroll passage 21 can be formed without forming the coolant passage in the vertical wall 27, so that it is possible to prevent the vertical wall 27 from becoming thick. Particularly, in the present embodiment, the extending passage 26 is provided so as to extend to the radially inner side of the recessed portion 25. Because of this, heat exchange is performed between the coolant circulating through the first coolant passage 12 and the vertical wall 27, so that the vertical wall 27 can be cooled down. That is, by avoiding an increase of an overall length of the turbine housing 20 in the axial direction of the turbine impeller 30, it is possible to obtain an effect of cooling down the flange 23 and the scroll passage 21 while avoiding upsizing of the turbocharger 100.

(5) Since the first coolant passage 12 is provided so as to extend to the turbine housing 20 by means of the extending passage 26, heat exchange is performed between the coolant circulating through the first coolant passage 12 and the turbine housing 20. That is, it is possible to promote an increase in temperature of the coolant circulating through the first coolant passage 12 by heat of the turbine housing 20, thereby making it possible to promote, by the coolant thus increased in temperature, warming up of the bearing housing 10 that is hard to be warmed up as compared with the turbine housing 20 exposed to exhaust gas. That is, it is possible to perform heat exchange between the turbine housing 20 and the bearing housing 10 effectively.

(6) When excessive thermal expansion occurs on a sealing surface where the flange 23 abuts with the flange 13, a sealing characteristic cannot be maintained. According to the present embodiment, it is possible to cool down the flange 23, so thermal expansion of the flange 23 is reduced. That is, a change in dimension at the time of manufacture is reduced, thereby making it is possible to restrain a decrease in the sealing characteristic between the flange 23 and the flange 13.

Figure 4:
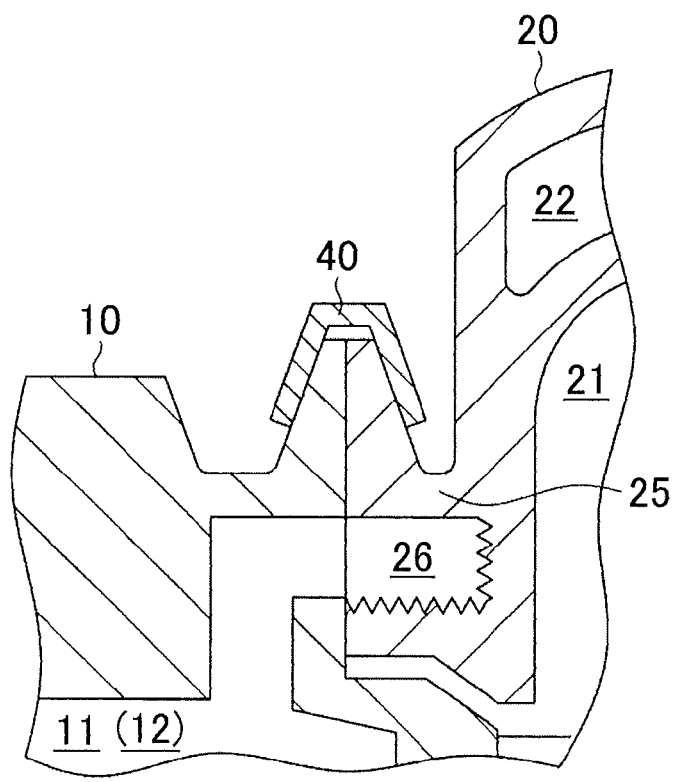
FIG. 4 is a sectional view illustrating a vicinal area of a recessed portion in a modification of the turbocharger.

The above embodiment is performable in the following embodiments in which the above embodiment is modified appropriately. As illustrated in FIG. 4, such a configuration in which a surface of an extending passage 26 is formed to be rough may be employed. The surface of the extending passage 26 is roughened more than a surface of a main passage 11. According to this configuration, since the surface of the extending passage 26 is rough, a surface area of a wall surface formed by the extending passage 26 in a first coolant passage 12 increases. That is, since an area where the wall surface of the coolant passage makes contact with coolant increases, it is possible to improve efficiency of heat transfer between the turbine housing 20 and the coolant. Further, it is possible to restrain a stress due to a difference in thermal expansion amount because the efficiency of heat transfer improves. Accordingly, it is possible to more effectively restrain the stress from concentrating on the recessed portion 25.

FIG. 4 illustrates a configuration in which that part of the surface of the extending passage 26 which is placed on a radially inner side of the turbine housing 20 is roughened, as an example of the configuration in which the surface of the extending passage 26 is formed to be rough. Exhaust gas compressed through a scroll passage 21 is sprayed on a turbine impeller 30 accommodated in the turbine housing 20. Accordingly, a wall on the radially inner side of the turbine housing 20 is exposed to high-temperature exhaust gas compressed and sprayed on the turbine impeller 30, so that a temperature of the wall easily becomes high in particular in the turbine housing 20. Because of this, if that part of the surface of the extending passage 26 which is placed at the radially inner side of the turbine housing 20 is formed to be rough, it is possible to increase cooling efficiency with respect to that wall surface on the radially inner side the temperature of which easily becomes high in particular in the turbine housing 20. Accordingly, it is possible to effectively cool down that wall surface on the radially inner side the temperature of which easily becomes high in particular in the turbine housing 20.

FIG. 4 merely schematically illustrates a state where the surface of the extending passage 26 is roughened, and it is not necessary to roughen the surface so as to be able to be seen. Further, a whole area of the extending passage 26 may be roughened more than the surface of the main passage 11.

In the above embodiment, the wall on the bearing-housing-10 side in the wall constituting the scroll passage 21 is the vertical wall 27 extending vertically so as to be perpendicular to the axial direction. However, the wall is a wall constituting the scroll passage, so a shape of the wall may be changed following a shape of the scroll passage. That is, the wall is not limited to a vertical wall, but may be curved, for example. In the above embodiment, the coolant passage is not formed on the wall, which does not disturb the change in the shape of the wall.

In the above embodiment, the extending passage 26 is formed as a consecutively annular groove, but a configuration of the extending passage 26 is not limited to this. The extending passage 26 may be a groove that allows the coolant to circulate through the flange 23. For example, the groove may not be provided continuously. Further, a shape of the groove viewed from a flange-23 side may not be annular, but may be rectangular, for example.

Unlike the above embodiment, the extending passage 26 may not be provided so as to extend to the radially inner side of the recessed portion 25. If the extending passage 26 is formed so as to be opened on the abutting surface 24 so that the extending passage 26 is connected to the main passage 11, it is possible to cool down the flange 23 by the coolant circulating through the first coolant passage 12.

The above embodiment exemplifies a configuration in which the first coolant passage 12 and the second coolant passage 22 are provided in parallel to each other in a coolant circulation course in the internal combustion engine, but they may not be provided in parallel to each other. Even in a case where the first coolant passage 12 and the second coolant passage 22 are provided in series, if the turbocharger has a structure that allows the coolant to circulate through the flange 23, it is possible to restrain a stress from concentrating on the recessed portion 25.

In the above embodiment, the bearing housing 10 and the turbine housing 20 are fastened and fixed by sandwiching the flange 13 and the flange 23 by the clamp 40, but the fixation of the bearing housing 10 and the turbine housing 20 may not be achieved by the sandwiching by the clamp 40. For example, the bearing housing 10 and the turbine housing 20 may be fastened and fixed with a bolt by passing the bolt through the flange 13 and the flange 23.

What is claimed is:

1. A turbocharger comprising:
   a turbine impeller;
   a rotating shaft connected to the turbine impeller;
   a bearing housing configured to accommodate the rotating shaft in the bearing housing; and
   a turbine housing configured to accommodate the turbine impeller in the turbine housing,
   the turbine housing including a scroll passage and a second flange, the scroll passage surrounding the turbine impeller, the second flange abutting with the bearing housing,
   the turbine housing having an outer surface provided with a recessed portion, the recessed portion being provided between the scroll passage and the second flange, the recessed portion being a depressed portion toward an inner surface of the turbine housing from the outer surface of the turbine housing, and
   the bearing housing having a main passage, the second flange having an extending passage, the main passage being connected to the extending passage so as to constitute a first coolant passage, and the turbine housing having a second coolant passage around the scroll passage.

2. The turbocharger according to claim 1, wherein
   the bearing housing includes a first flange,
   the first flange has a flange surface abutting with the second flange of the turbine housing, the flange surface being a surface perpendicular to an axial direction of the rotating shaft,
   the extending passage extends in a direction from the flange surface toward the scroll passage along the axial direction of the rotating shaft,
   in the turbine housing, a first distance in the axial direction of the rotating shaft is shorter than a second distance in the axial direction of the rotating shaft,
   the first distance indicates a distance, along the axial direction of the rotating shaft, between the flange surface and a part where a wall thickness between the recessed portion and the inner surface of the turbine housing is thinnest in that section of the turbine housing which is perpendicular to the axial direction of the rotating shaft, and
   the second distance indicates a distance, along the axial direction of the rotating shaft, between the flange surface and a bottom of the extending passage in the axial direction of the rotating shaft.

3. The turbocharger according to claim 1, wherein at least part of a surface of the extending passage is rougher than a surface of the main passage.

4. The turbocharger according to claim 3, wherein a part of the surface of the extending passage is rougher than the surface of the main passage, the part of the surface being placed at a radially inner side of the turbine housing.

* * * * *